United States Patent
Wilcox

(10) Patent No.: US 12,170,472 B2
(45) Date of Patent: Dec. 17, 2024

(54) FIELD ATTACHABLE AND PRESSURE TESTABLE COUPLING FOR METAL-TO-METAL MOTOR LEAD EXTENSIONS

(71) Applicant: Baker Hughes Oilfield Operations LLC, Houston, TX (US)

(72) Inventor: Spencer Wilcox, Claremore, OK (US)

(73) Assignee: Baker Hughes Oilfield Operations LLC

(*) Notice: Subject to any disclaimer, the term of this patent is extended or adjusted under 35 U.S.C. 154(b) by 509 days.

(21) Appl. No.: 17/531,564

(22) Filed: Nov. 19, 2021

(65) Prior Publication Data

US 2023/0163659 A1    May 25, 2023

(51) Int. Cl.
*H02K 5/132* (2006.01)
*E21B 17/02* (2006.01)
*E21B 43/12* (2006.01)
*H01R 13/622* (2006.01)
*H02K 5/22* (2006.01)

(52) U.S. Cl.
CPC .......... *H02K 5/132* (2013.01); *E21B 17/0285* (2020.05); *E21B 43/128* (2013.01); *H01R 13/622* (2013.01); *H02K 5/225* (2013.01)

(58) Field of Classification Search
CPC .......... H02K 5/132; H02K 5/225; H02K 5/10; E21B 17/0285; E21B 43/128; H01R 13/622; H01R 13/523; H01R 31/06; F04B 47/06

See application file for complete search history.

(56) References Cited

U.S. PATENT DOCUMENTS

| | | | |
|---|---|---|---|
| 4,728,296 A * | 3/1988 | Stamm | H01R 13/533 439/465 |
| 5,714,680 A * | 2/1998 | Taylor | G01L 23/16 356/519 |
| 7,611,339 B2 | 11/2009 | Tetzlaff et al. | |

(Continued)

FOREIGN PATENT DOCUMENTS

| CN | 211789608 U | 10/2020 |
|---|---|---|
| WO | 2018107136 A1 | 6/2018 |

OTHER PUBLICATIONS

ISA/US; Search Report and Written Opinion for PCT/US2022/080147 mailed Mar. 13, 2023.

*Primary Examiner* — Dominick L Plakkoottam
(74) *Attorney, Agent, or Firm* — Baker Hughes Company

(57) ABSTRACT

A motor lead coupler is configured to provide a metal-to-metal sealed connection between a first motor lead extension and a second motor lead extension. The motor lead coupler includes a first plurality of receivers on a first end of the body, a second plurality of receivers on a second end of the body, and a plurality of intermediate terminals. Each of the first plurality of receivers is configured to receive a corresponding one of the first plurality of leads, and each of the second plurality of receivers is configured to receive a corresponding one of the second plurality of leads. Each of the intermediate terminals is connected between a corresponding pair of the first plurality of receivers and the second plurality of receivers. The motor lead coupler includes pressure test ports that can be used to pressure test the connection between individual leads and the motor lead coupler.

17 Claims, 3 Drawing Sheets

(56) References Cited

U.S. PATENT DOCUMENTS

| | | | |
|---|---|---|---|
| 9,071,008 B2* | 6/2015 | Zillinger | H01R 13/533 |
| 9,336,929 B2* | 5/2016 | Holzmueller | H01B 7/046 |
| 10,938,145 B2* | 3/2021 | Golberg | H01R 13/523 |
| 2008/0026623 A1* | 1/2008 | Emerson | E21B 43/128 |
| | | | 439/275 |
| 2013/0052055 A1* | 2/2013 | Frey | H01R 13/5205 |
| | | | 439/372 |
| 2013/0183177 A1 | 7/2013 | Manke et al. | |
| 2015/0207245 A1* | 7/2015 | Emerson | H02G 15/18 |
| | | | 29/869 |
| 2016/0024854 A1* | 1/2016 | Clingman | H01R 13/6215 |
| | | | 439/587 |
| 2016/0047383 A1* | 2/2016 | Wilcox | E21B 43/128 |
| | | | 310/71 |
| 2016/0102659 A1* | 4/2016 | Gilmore | F04D 29/08 |
| | | | 417/410.1 |
| 2016/0181884 A1* | 6/2016 | Rumbaugh | H01R 13/523 |
| | | | 310/71 |
| 2018/0094492 A1* | 4/2018 | Knapp | E21B 17/023 |
| 2018/0202271 A1* | 7/2018 | Semple | E21B 43/128 |
| 2018/0363431 A1 | 12/2018 | Crowley et al. | |
| 2020/0091652 A1* | 3/2020 | Golberg | H01R 13/523 |
| 2021/0381350 A1* | 12/2021 | Semple | F04D 29/086 |

\* cited by examiner

FIELD ATTACHABLE AND PRESSURE TESTABLE COUPLING FOR METAL-TO-METAL MOTOR LEAD EXTENSIONS

FIELD OF THE INVENTION

The present invention relates generally to electric submersible pumping systems and more particularly to systems and methods for securely connecting and testing multiple motor lead extensions.

BACKGROUND

Submersible pumping systems are often deployed into wells to recover petroleum fluids from subterranean reservoirs. Typically, a submersible pumping system includes a number of components, including an electric motor coupled to one or more high performance pump assemblies. Production tubing is connected to the pump assemblies to deliver the petroleum fluids from the subterranean reservoir to a storage facility on the surface.

The motor is typically an oil-filled, high capacity electric motor that can vary in length from a few feet to nearly one hundred feet, and may be rated up to hundreds of horsepower. Typically, electricity is generated on the surface and supplied to the motor through a heavy-duty power cable. The power cable typically includes several separate conductors that are individually insulated within the power cable. Power cables are often constructed in round or flat configurations.

In many applications, power is conducted from the power cable to the motor via a "motor lead extension" or "motor lead cable." The motor lead extension typically includes one or more "leads" that are configured for connection to a mating receptacle on the motor. The leads from the motor lead extension are often retained within a motor-connector that is commonly referred to as a "pothead." The pothead relieves the stress or strain realized between the motor and the leads from the motor lead extension. Motor lead extensions are often constructed in a "flat" configuration for use in the limited space between downhole equipment and the well casing.

Power and motor lead cables typically include a conductor, insulation surrounding the conductor, a barrier covering the insulation, a lead-based sheathing that encases the barrier and a durable external armor that surrounds the sheathing. As an alternative to lead-based sheathing, manufacturers have attempted to use alloy-based capillary tubing as protective jacket around the insulated conductors. Conventional capillary tubing is produced as a seamless extruded tube through which the conductor and insulation layers must be pulled. The frictional interface between the insulated conductor and conventional capillary tubing frustrates efforts to encapsulate longer conductors within the closed capillary tubing. This prevents the use of capillary tubing sheathing for all but the shortest motor lead cables.

In applications where longer motor lead extensions are needed, two motor lead extensions can be spliced together using overlapping layers of tape. Many operators will not permit the use of taped splice connections, particularly where the taped splice would be located beneath a packer or other zonal isolation device in the well. In these situations, the total length of the motor lead extension is limited by the maximum length of a single motor lead extension. Accordingly, there is a need for an improved system for making and deploying motor lead extensions that provides well operators with a range of longer motor lead extensions. It is to these and other deficiencies in the prior art that exemplary embodiments of the present invention are directed.

SUMMARY OF THE INVENTION

In one aspect, embodiments of the present disclosure are directed to a pumping system for use in recovering wellbore fluids from a wellbore. The pumping system includes an electrical power source, a motor drive connected to the power source, a power cable connected to the motor drive, a submersible electric motor, and a pump driven by the electric motor. The pumping system further includes a motor lead coupler that joins together an upper motor lead extension and a lower motor lead extension. The upper motor lead extension has an upper end and a lower end, where the upper end of the upper motor lead extension is connected to the power cable and the lower end of the upper motor lead extension is connected to the motor lead coupler. The lower motor lead extension has an upper end and a lower end, where the lower end of the lower motor lead extension is connected to the motor and the upper end of the lower motor lead extension is connected to the motor lead coupler.

In another aspect, embodiments of the present disclosure are directed to a motor lead coupler for connecting a first motor lead extension to a second motor lead extension, where the first motor lead extension includes a first plurality of leads and the second motor lead extension includes a second plurality of leads. The motor lead coupler includes a body, a first plurality of receivers on a first end of the body, a second plurality of receivers on a second end of the body, and a plurality of intermediate terminals. Each of the first plurality of receivers is configured to receive a corresponding one of the first plurality of leads, and each of the second plurality of receivers is configured to receive a corresponding one of the second plurality of leads. Each of the intermediate terminals is connected between a corresponding pair of the first plurality of receivers and the second plurality of receivers.

In yet another aspect, embodiments of the present disclosure are directed to a method for connecting an upper motor lead extension to a lower motor lead extension with a motor lead coupler, wherein each of the upper motor lead extension and the lower motor lead extension includes a plurality of motor leads that have a conductor, an insulator surrounding the conductor, and a metal tube surrounding the insulator. The method includes the steps of removing a portion of the metal tube from an end of each of the plurality of leads to expose a portion of the insulator, removing a portion of the exposed insulator from the end of each of the plurality of leads to expose a conductor tip, placing a metal compression nut over the metal tube of each lead, and placing a metal ferrule over the metal tube of each lead such that the ferrule is between the compression nut and the conductor tip.

The method continues with the steps of inserting the conductor tip, the exposed portion of the insulator, and a portion of the metal tube of each lead into a corresponding one of a plurality of receivers within the motor lead coupler. The method further includes the step of securing each lead within the corresponding one of the plurality of receivers by tightening the compression nut into the receiver to form a metal-to-metal seal between the motor lead coupler, the ferrule, and the metal tube. In some embodiments, the method further includes the step of conducting a pressure test on the connection between each lead and the motor lead coupler by connecting a source of pressurized fluid to a pressure test port adjacent to each of the plurality of receivers on the motor lead coupler.

WRITTEN DESCRIPTION

Figure 1:
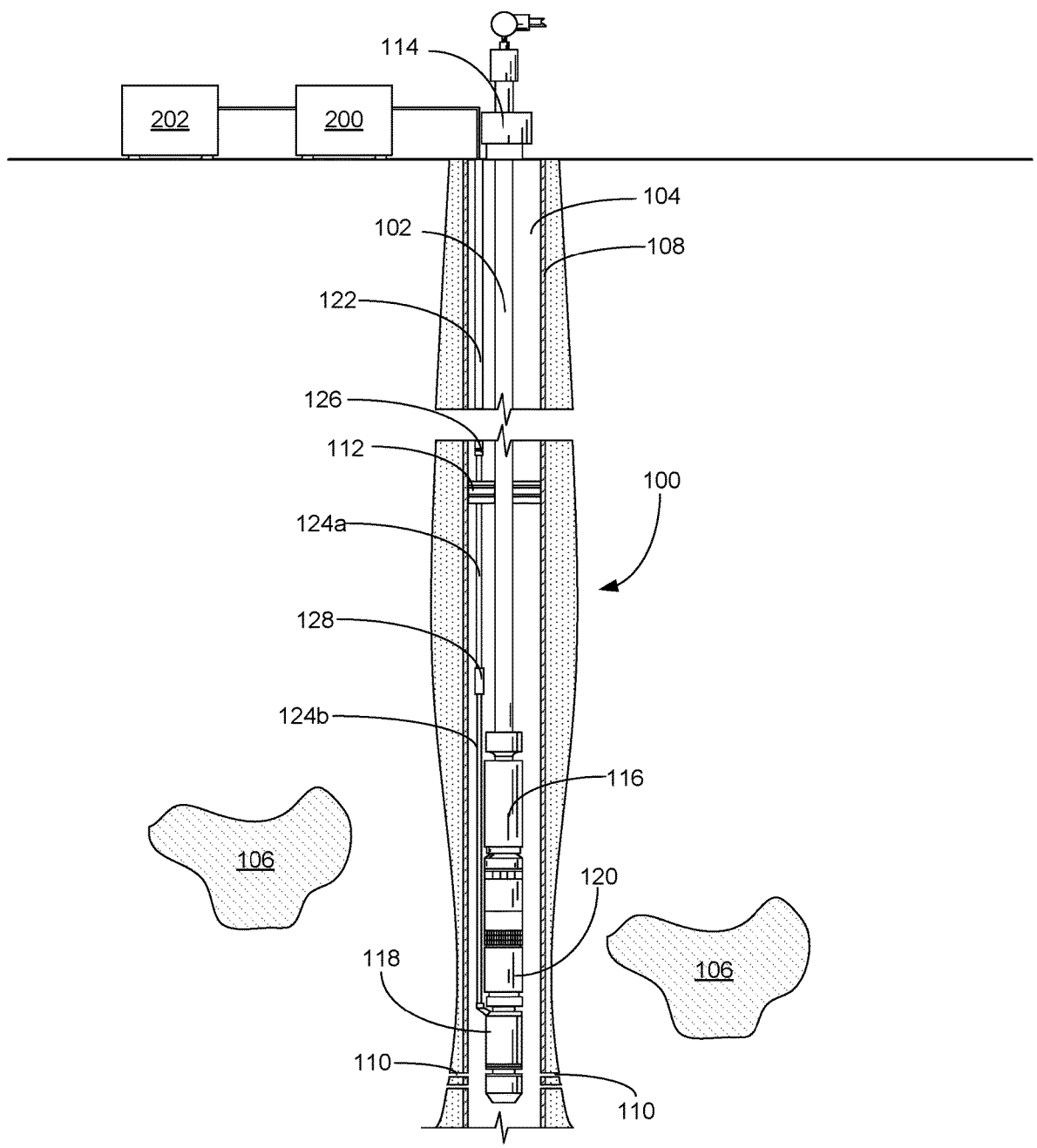
FIG. 1 depicts the installation of upper and lower motor lead extensions connected by a motor lead coupling constructed in accordance with exemplary embodiments.

In accordance with an exemplary embodiment of the present invention, FIG. 1 shows a front view of a downhole pumping system 100 attached to production tubing 102. The downhole pumping system 100 and production tubing 102 are disposed in a wellbore 104, which is drilled for the production of a fluid such as water or petroleum from a subterranean geologic formation 106.

The wellbore 104 includes a casing 108, which has perforations 110 that permit the exchange of fluids between the wellbore 104 and the geologic formation 106. One or more packers 112 or other zonal isolation devices can be used to separate various segments or stages within the wellbore 104. Although the downhole pumping system 100 is depicted in a vertical well, it will be appreciated that the downhole pumping system 100 can also be used in horizontal, deviated, and other non-vertical wells. Accordingly, the terms "upper" and "lower" should not be construed as limiting the disclosed embodiments to use in vertical wells. The terms "upper" and "lower" are simply intended to provide references to components that are closer to the wellhead 114 ("upper") or closer to the perforations 110 and terminal end of the wellbore 104 ("lower").

The production tubing 102 connects the pumping system 100 to a wellhead 114 located on the surface. Although the pumping system 100 is primarily designed to pump petroleum products, it will be understood that the present invention can also be used to move other fluids. It will also be understood that, although each of the components of the pumping system 100 are primarily disclosed in a submersible application, some or all of these components can also be used in surface pumping operations.

The pumping system 100 includes a pump 116, a motor 118 and a seal section 120. The motor 118 is an electric motor that receives its power from a surface-based supply through a power cable 122 and a plurality of motor lead extensions 124. In many embodiments, the power cable 122 and motor lead extensions 124 are configured to supply the motor 118 with three-phase electricity from a surface-based variable speed (or variable frequency) drive 200, which receives electricity from a power source 202.

The motor 118 converts the electrical energy into mechanical energy, which is transmitted to the pump 116 by one or more shafts. The pump 116 then transfers a portion of this mechanical energy to fluids within the wellbore 104, causing the wellbore fluids to move through the production tubing 102 to the surface. In some embodiments, the pump 116 is a turbomachine that uses one or more impellers and diffusers to convert mechanical energy into pressure head. In other embodiments, the pump 116 is a progressive cavity (PC) or positive displacement pump that moves wellbore fluids with one or more screws or pistons.

The seal section 120 shields the motor 118 from mechanical thrust produced by the pump 116. The seal section 120 is also configured to prevent the introduction of contaminants from the wellbore 104 into the motor 118. Although only one pump 116, seal section 120 and motor 118 are shown, it will be understood that the downhole pumping system 100 could include additional pumps 116, seal sections 120 or motors 118.

As depicted in FIG. 1, there are two motor lead extensions 124: an upper (or first) motor lead extension 124a and a lower (or second) motor lead extension 124b. The upper motor lead extension 124a is connected to the power cable 122 with a power-to-motor connector 126, which may be located above or below the packer 112 (the connector 126 is located above the packer 112 in the embodiment depicted in FIG. 1).

The upper motor lead extension 124a is connected to the lower motor lead extension 124b with a motor lead coupler 128. As shown in FIG. 1, the motor lead coupler 128 is positioned below the packer 112 in the portion of the wellbore 104 that is more commonly exposed to wellbore fluids produced from the formation 106. As explained below, the motor lead coupler 128 provides a secure coupling device that can be easily assembled in the field as the pumping system 100 is being deployed in the wellbore 104. Moreover, the motor lead coupler 128 is configured for post-assembly pressure testing to ensure that the motor lead coupler 128 will provide a leak-resistant connection between two adjacent motor lead extensions 124. Although a single motor lead coupler 128 is depicted between upper and lower motor lead extensions 124a, 124b in FIG. 1, it will be appreciated that additional motor lead couplers 128 can be used as necessary to connect additional motor lead extensions 124 between the power cable 122 and the motor 118.

Figure 2:
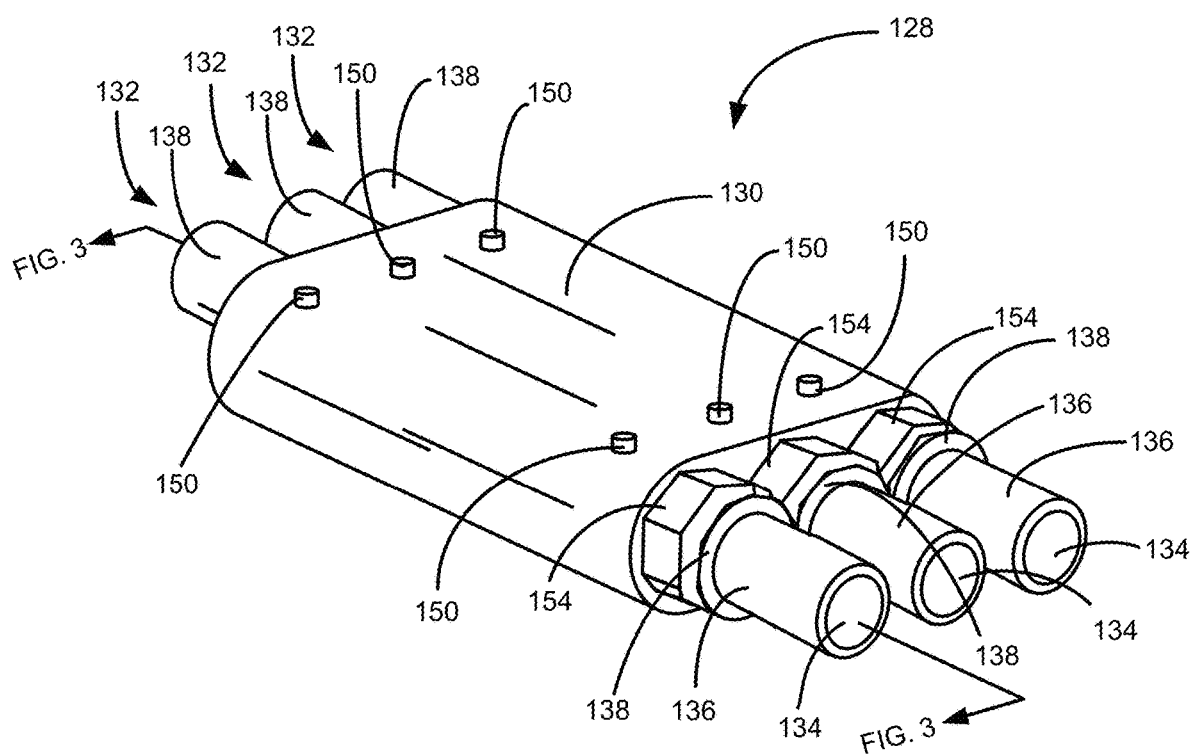
FIG. 2 is a perspective view of the motor lead coupling of FIG. 1.

Turning to FIG. 2, shown therein is a perspective view of one embodiment of the motor lead coupler 128. The motor lead coupler 128 includes a durable, corrosion-resistant body 130 that can be manufactured from Inconel or another metal alloy. The motor lead coupler 128 is generally configured to provide a sealed and electrically isolated connection between individual leads 132 from the upper and lower motor lead extensions 124a, 124b. The leads 132 each include a conductor 134 that is surrounded by an insulator 136, that is in turn encapsulated within an exterior metal tube 138. The conductor 134 can be a solid or stranded copper conductor. The insulator 136 can include one or more layers of electrically isolating and chemically resistant polymers. The metal tube 138 can be a capillary tube constructed from a corrosion-resistant metal alloy, such as Inconel.

Although the motor lead coupler 128 depicted in FIG. 2 is configured to provide a connection between three sets of individual leads 132 between the upper and lower motor lead extensions 124a, 12b, it will be appreciated that in other embodiments, a plurality of separate motor lead couplers 128 are used to connect the corresponding leads 132 of the upper and lower motor lead extensions 124a, 124b. For example, it may be desirable to use three separate "single lead" motor lead couplers 128 for connecting the three leads 132 commonly found in the upper and lower motor lead extensions 124a, 124b.

Figure 3:
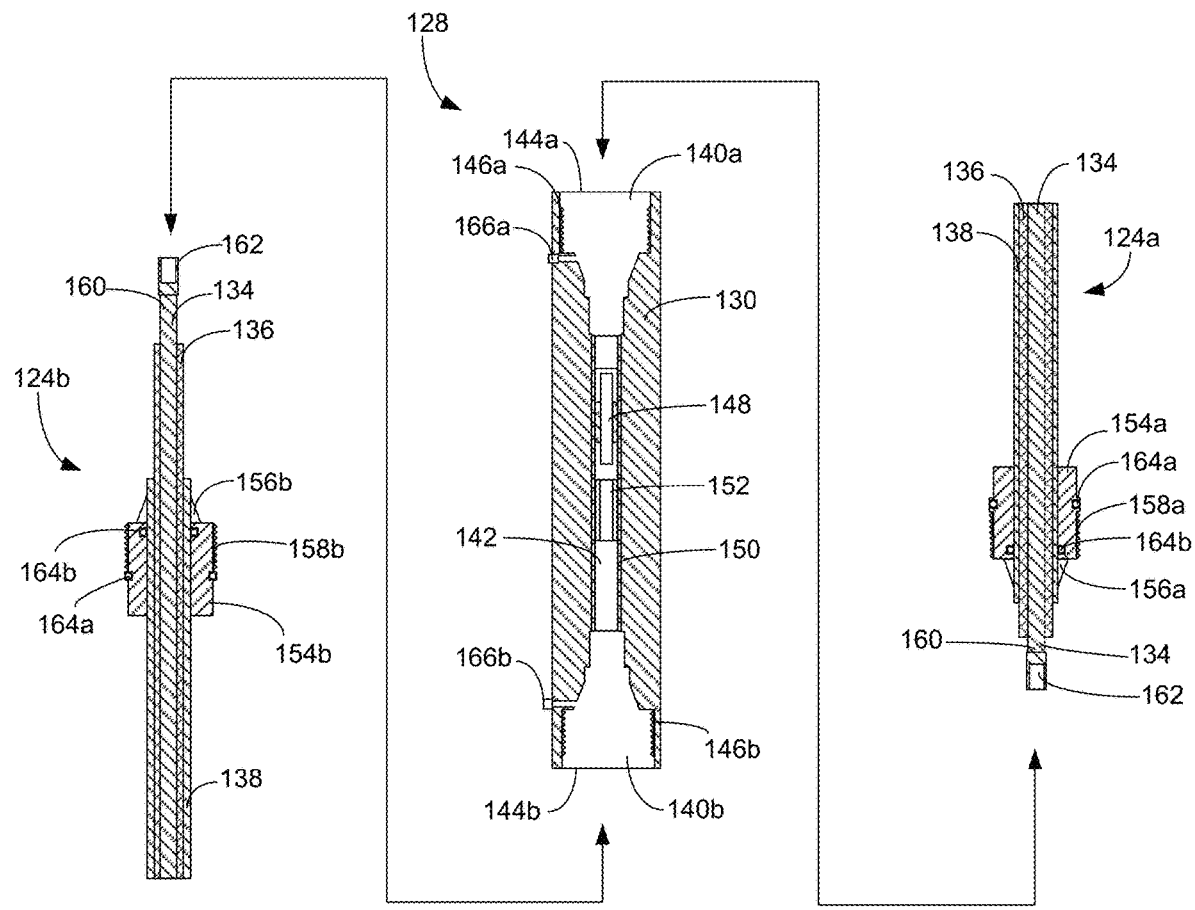
FIG. 3 is a cross-sectional and exploded view of the motor lead coupling of FIG. 2.
Figure 4:
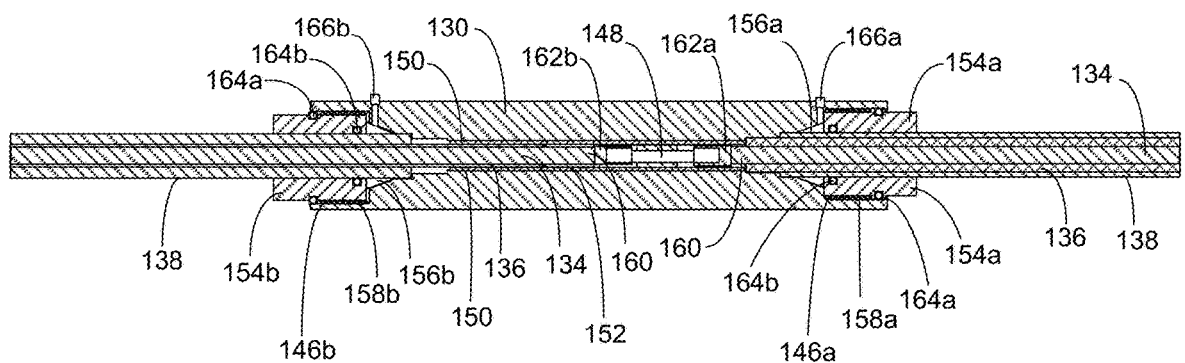
FIG. 4 is a cross-sectional view of the motor lead coupling of FIG. 3 in which the upper and lower motor leads are connected through the coupling.

Referring now also to FIGS. 3 and 4, shown therein are exploded and assembled cross-sectional views, respectively, of a portion of the motor lead coupler 128 illustrating the connections made between leads 132 from the upper and lower motor lead extensions 124a, 124b. It will be appreciated that in most applications, the motor lead coupler 128 will include three sets of various components depicted in FIGS. 3 and 4. That is, for each pair of leads 132 within the upper and lower motor lead extensions 124a, 124b, the motor lead coupler 128 includes an upper receiver 140a, a lower receiver 140b, and a central channel 142. As explained below, the upper receiver 140a and lower receiver 140b of the motor lead coupler 128 are generally configured to resemble the pothead connection on the motor 118 such that the upper and lower motor lead cables 124a, 124b can be configured for connection to the motor lead coupler 128 in the field with minimal modification.

As best illustrated in FIG. 3, the upper receiver 140a and lower receiver 140b include openings 144a, 144b, respectively, that extend toward one another from opposite ends of the body 130 of the motor lead coupler 128. The central channel 142 has a smaller diameter than the upper and lower openings 144a, 144b, which may include upper and lower receiver threads 146a, 146b. The motor lead coupler 128 includes an intermediate terminal 148 positioned within the central channel 142. The intermediate terminal 148 provides a conductive connector between the corresponding leads 132 of the upper and lower motor lead extensions 124a, 124b. In some embodiments, the motor lead coupler 128 includes an insulator tube 150 within at least a portion of the central channel 142. In other embodiments, the entire length of the central channel 142 is shielded by the insulator tube 150. The insulator tube 150 electrically isolates the components inside the central channel 142 from the body 130 of the motor lead coupler 128.

In some embodiments, the motor lead coupler 128 further includes a pothead insulator 152 inside the insulator tube 150. The pothead insulator 152 provides an additional layer of electrical insulation for the upper end of the lower motor lead extension 124b. As depicted in FIG. 4, the pothead insulator 152 can be located within the insulator tube 150 of the central channel 142 in a position to receive the uninsulated portion of the conductor 134.

In some embodiments, the motor lead coupler 128 also includes upper and lower pressure test ports 166a, 166b, which provide a mechanism for connecting a pressure test kit (not shown) to the upper and lower receivers 140a, 140b on the motor lead coupler 128. In these embodiments, each lead 132 of the upper and lower motor lead extensions 124a, 124b further includes one or more compliant seals 164 for enabling the pressure testing function of the pressure test ports 166a, 166b. As depicted in FIGS. 3 and 4, the leads 132 include an outer seal 164a and an inner seal 164b. The outer seal 164a seals between the outside of the compression nuts 154 and the corresponding receivers 140. The inner seal 164b seals between the inside of the compression nuts 154 and the outside of the metal tube 138. In the embodiment depicted in FIGS. 3 and 4, the inner seal 164b is positioned inboard and adjacent to the upper and lower ferrules 146a, 146b.

The upper motor lead cable 124a extends between the power-to-motor cable connector 126 and the motor lead coupler 128. The lower motor lead cable 124b extends from the motor lead coupler 128 to the motor 118. The lower end of the upper motor lead cable 124a and the upper end of the lower motor lead cable 124b are each initially configured to be connected into the conventional pothead connection on the motor 118. Likewise, the upper and lower receivers 140a, 140b each are configured to match the general form of the pothead connector on the motor 118.

As best illustrated in FIG. 2, the lower end of the upper motor lead extension 124a has been prepared by cutting back a portion of the metal tube 138 to reveal a length of exposed insulator 136 around the conductor 134. An upper compression nut 154a and upper ferrule 156a are installed around the metal tube 138 of each lead 132 of the upper motor lead extension 124a. The upper ferrule 156a and upper compression nut 154a are manufactured from a suitable corrosion-resistant metal. The upper compression nut 154a includes threads 158a that mate with corresponding receiver threads 146a in the upper receiver 140a. When each lead 132 of the upper motor lead extension 124a is inserted into the corresponding upper receiver 140a of the motor lead coupler 128, the upper compression nut 154a can be threaded into the receiver threads 146a of the upper receiver 140a and tightened to a specified extent. This compresses and deforms the upper ferrule 156a within the narrowing upper receiver 140a to create a sealed, metal-to-metal connection between the metal tube 138 of the lead 132 and the interior of the motor lead coupler 128.

In some embodiments, the upper end of the lower motor lead extension 124b is prepared in the same way as the lower end of the upper motor lead extension 124a. In those embodiments, the lower receiver 140b is configured to match the upper receiver 140a. In other embodiments, the upper end of the lower motor lead extension 124b includes a longer length of exposed insulator 136. In most applications, the lowermost motor lead extension 124b is provided with excess length, which permits the use of a longer section of insulator 136. In this way, the upper end of the lower motor lead extension 124b has been prepared by cutting back a portion of the metal tube 138 to reveal a longer length of exposed insulator 136 around the conductor 134. In these embodiments, it may not be necessary to install the cylindrical pothead insulator 152 to cover the exposed insulator 136 of the lower motor lead extension 124b. The longer section of the insulator 136 provide sufficient protection within the motor lead coupler 128, which has been configured to accommodate the longer exposed insulator 136 by lengthening the lower receiver 140b.

A lower upper compression nut 154b and lower ferrule 156b are installed around the metal tube 138 of each lead 132 of the lower motor lead extension 124b. The lower ferrule 156b and lower compression nut 154b are manufactured from a suitable corrosion-resistant metal. The lower compression nut 154b includes threads 158b that mate with corresponding receiver threads 146b in the lower receiver 140b. When each lead 132 of the lower motor lead extension 124b is inserted into the corresponding lower receiver 140b of the motor lead coupler 128, the lower compression nut 154b can be threaded into the receiver threads 146b of the lower receiver 140b and tightened to a specified extent. This compresses and deforms the lower ferrule 156b within the narrowing lower receiver 140b to create a sealed, metal-to-metal connection between the metal tube 138 of the lead 132 and the interior of the motor lead coupler 128.

In some embodiments, the insulator 136 is cut back from the distal end of each lead 132 to reveal an uninsulated, exposed conductor tip 160. The conductor tip 160 is configured to be captured within the intermediate terminal 148. In other embodiments, a lead terminal 162 is attached to the conductor tip 160. The lead terminal 162 can be configured for a mating engagement with the corresponding side of the intermediate terminal 148. For example, in some embodiments, the lead terminal 162 is configured as a socket that receives a post from the intermediate terminal 148. In other embodiments, the lead terminal 162 is configured as a post that is received within a socket of the intermediate terminal 148.

It will be appreciated that the leads 132 of the upper motor lead extension 124a can be configured differently than the leads 132 of the lower motor lead extension 124b. In exemplary embodiments, the upper motor lead extension 124 can be configured for use without modification in the field where the upper receivers 140a of the motor lead coupler 128 are configured to match a standard motor pothead connection. This permits the use of an "off-the-shelf" motor lead extension 124 for the upper motor lead extension 124. Because the standard motor lead extension used for the lower motor lead extension 124b is typically configured for connection between the power cable 122 and the motor 118, the upper end of the lower motor lead extension 124b will typically require minor modification before it can be connected to the motor lead coupler 128.

Thus, in an exemplary method of assembly and installation, the lower end of the lower motor lead extension 124b is connected to the motor 118 using the standard pothead connection. The lower motor lead extension 124b is then banded to the pumping system 100 or production tubing 102 to support the weight of the lower motor lead extension 124b. The upper (free) end of the lower motor lead extension 124b can be prepared as set forth above and connected to the motor lead coupler 128. Each lead 132 of the lower motor lead extension 124b is secured within a corresponding lower receiver 140b of the motor lead coupler 128. The motor lead coupler 128 is designed to securely accept each lead 132 of the lower motor lead extension 124b with minimal modification to the lower motor lead extension 124b, which can easily be performed in the field before the pumping system 100 is deployed into the wellbore 104.

Once the lower motor lead extension 124b has been secured to the motor lead coupler 128, the lower end of the upper motor lead extension 124a can be similarly attached to the motor lead coupler 128 by securing each lead 132 into a corresponding one of the upper receivers 140a. In exemplary embodiments, the upper receivers 140a are configured to match the standard pothead connection on the motor 118 such that no field modification to the lower end of the upper motor lead extension 124a is necessary. The upper end of the upper motor lead extension 124a can then be connected to the power cable 122 using the conventional power-to-motor connector 126, or by tape-splicing the upper motor lead cable 124a to the power cable 122.

The motor lead coupler 128 provides a mechanism for connecting two motor lead extensions 128 with a robust metal-to-metal seal. To confirm that the upper and lower motor lead extensions 124a, 124b have been properly secured within the motor lead coupler 128, the installer can perform a pressure test by connecting the field pressure test kit to the upper and lower pressure test ports 166a, 166b. As illustrated in FIGS. 3 and 4, the upper and lower pressure test ports 166a, 166b are located inboard of the upper and lower compression nuts 154a, 154b, ferrules 156a, 156b, and seals 164a, 164b. Although a wide variety of pressure tests can be conducted, in one embodiment a standard leak test is performed by connecting an external source of fluid pressure to each of the upper and lower pressure test ports 166a, 166b.

Once the test pressure has been applied through the pressure test ports 166a, 166b, the pressure can be monitored for a test period. If the pressure remains substantially the same throughout the test period, this indicates that each of the leads 132 has been properly sealed within the corresponding receiver 140 of the motor lead coupler 128. If the pressure begins to fall during the test period, this indicates that one or more of the sealing features between the lead 132 and the motor lead coupler 128 is unsatisfactory and requires attention. In some pressure tests, the pressure applied to the pressure test ports 166a, 166b is increased and decreased in a cyclic manner to test the resiliency of the connections between the leads 132 and the motor lead coupler 128 over multiple pressure cycles. The ability to easily pressure test the connection made by the motor lead coupler 128 between the upper and lower motor lead extensions 124a, 124b presents a significant advantage over prior art methods of tape-splicing motor lead extensions together.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. Where a particular reference numeral has been modified with "a" or "b" to represent similar components in different portions of a system (e.g., upper widget 999a and lower widget 999b), use of the reference numeral alone designates both of the similar components (e.g., upper and lower widgets 999). It will be appreciated by those skilled in the art that the teachings of the present invention can be applied to other systems without departing from the scope and spirit of the present invention.

What is claimed is:

1. A pumping system for use in recovering wellbore fluids from a wellbore, the pumping system comprising:
an electrical power source;
a motor drive connected to the power source;
a power cable connected to the motor drive;
a submersible electric motor;
a pump driven by the electric motor;
a motor lead coupler, wherein the motor lead coupler comprises:
  a plurality of upper receivers;
  a plurality of lower receivers;
an upper motor lead extension having an upper end and a lower end, wherein the upper end of the upper motor lead extension is connected to the power cable and the lower end of the upper motor lead extension is connected to the motor lead coupler, wherein the lower end of the upper motor lead extension includes a plurality of leads and wherein each of the plurality of leads comprises:
  a conductor;
  an insulator surrounding the conductor;
  a metal tube surrounding the insulator;
  an upper deformable ferrule around the outside of the metal tube;
  an upper compression nut, wherein the upper compression nut can be tightened into the corresponding upper receiver to compress and deform the upper ferrule into a metal-to-metal sealed relationship with the corresponding upper receiver;
a lower motor lead extension having an upper end and a lower end, wherein the lower end of the lower motor lead extension is connected to the motor and the upper end of the lower motor lead extension is connected to the motor lead coupler, wherein the upper end of the lower motor lead extension includes a plurality of leads and wherein each of the plurality of leads comprises:
- a conductor;
- an insulator surrounding the conductor;
- a metal tube surrounding the insulator;
- a lower deformable ferrule around the outside of the metal tube;
- a lower compression nut, wherein the lower compression nut can be tightened into the corresponding lower receiver to compress and deform the lower ferrule into a metal-to-metal sealed relationship with the corresponding lower receiver.

2. The pumping system of claim 1, wherein the motor lead coupler comprises:
- a plurality of central channels, wherein each of the plurality of central channels extends between a corresponding one of the plurality of upper receivers and a corresponding one of the plurality of lower receivers; and
- a plurality of intermediate terminals, wherein each of the plurality of intermediate terminals is positioned inside a corresponding one of the plurality of central channels and wherein each of the plurality of intermediate terminals includes an upper end and a lower end.

3. The pumping system of claim 1, wherein each of the plurality of upper receivers is configured to accept a corresponding one of the plurality of leads of the upper motor lead extension.

4. The pumping system of claim 3, wherein each of the upper receivers includes an opening with receiver threads.

5. The pumping system of claim 4, wherein the upper compression nut has upper compression nut threads that are configured for engagement with the receiver threads of the corresponding upper receiver.

6. The pumping system of claim 2, wherein the conductor of each of the plurality of leads of the lower end of the upper motor lead extension connects to the upper end of a corresponding one of the plurality of intermediate terminals.

7. The pumping system of claim 1, wherein each of the plurality of lower receivers is configured to accept a corresponding one of the plurality of leads of the lower motor lead extension.

8. The pumping system of claim 7, wherein each of the lower receivers includes an opening with receiver threads.

9. The pumping system of claim 8, where the lower compression nut has lower compression nut threads that are configured for engagement with the receiver threads of the corresponding lower receiver.

10. The pumping system of claim 9, wherein the motor lead coupler further comprises:
- a plurality of upper pressure test ports, wherein each of the plurality of upper pressure test ports extends into a corresponding one of the plurality of upper receivers; and
- a plurality of lower pressure test ports, wherein each of the plurality of lower pressure test ports extends into a corresponding one of the plurality of lower receivers.

11. The pumping system of claim 10, wherein the conductor of each of the plurality of leads of the upper end of the lower motor lead extension connects to the lower end of a corresponding one of the plurality of intermediate terminals.

12. A motor lead coupler for connecting a first motor lead extension to a second motor lead extension, where the first motor lead extension includes a first plurality of leads and the second motor lead extension includes a second plurality of leads, the motor lead coupler comprising:
- a body;
- a first plurality of receivers on a first end of the body, wherein each of the first plurality of receivers is configured to receive a corresponding one of the first plurality of leads;
- a second plurality of receivers on a second end of the body, wherein each of the second plurality of receivers is configured to receive a corresponding one of the second plurality of leads;
- a plurality of central channels, wherein each of the plurality of central channels is connected between a corresponding pair of the first plurality of receivers and the second plurality of receivers;
- a plurality of intermediate terminals, wherein each of the plurality of intermediate terminals is located within a corresponding one of the plurality of central channels;
- a plurality of insulator tubes, wherein each of the plurality of insulator tubes is located in a corresponding one of the plurality of central channels and extends between a corresponding one of the first plurality of receivers and a corresponding one of the second plurality of receivers and wherein each of the plurality of insulator tubes surrounds a corresponding one of the plurality of intermediate terminals; and
- a plurality of pothead insulators, wherein each of the plurality of pothead insulators is located inside a corresponding one of the plurality of insulator tubes adjacent to a corresponding one of the plurality of intermediate terminals.

13. The motor lead coupler of claim 12, wherein each of the first plurality of receivers includes an opening with first receiver threads that are configured to receive a compression nut on a corresponding one of the first plurality of leads.

14. The motor lead coupler of claim 13, wherein each of the second plurality of receivers includes an opening with second receiver threads that are configured to receive a compression nut on a corresponding one of the second plurality of leads.

15. A method for connecting an upper motor lead extension to a lower motor lead extension with a motor lead coupler, wherein each of the upper motor lead extension and the lower motor lead extension includes a plurality of motor leads that each have a conductor, an insulator surrounding the conductor, and a metal tube surrounding the insulator, the method comprising the steps of:
- removing a portion of the metal tube from an end of each of the plurality of leads to expose a portion of the insulator;
- removing a portion of the exposed insulator from the end of each of the plurality of leads to expose an uninsulated conductor tip;
- placing a metal compression nut over the metal tube of each lead;
- placing a metal ferrule over the metal tube of each lead, wherein the ferrule is between the compression nut and the conductor tip;
- inserting the conductor tip, the exposed portion of the insulator and a portion of the metal tube of each lead into a corresponding one of a plurality of receivers within the motor lead coupler;
- securing each lead within the corresponding one of the plurality of receivers by tightening the compression nut into the receiver to deform the ferrule and form a metal-to-metal seal between the motor lead coupler, the ferrule, and the metal tube; and conducting a pressure test on the connection between each lead and the motor lead coupler by connecting a source of pressurized fluid to a pressure test port adjacent each of the plurality of receivers on the motor lead coupler.

16. The method of claim 15, wherein the step of inserting the conductor tip further comprises inserting the exposed conductor tip of each lead of the lower motor lead extension into a pothead insulator located inside an insulator tube within a corresponding central channel of the motor lead coupler.

17. The method of claim 15, wherein the step of inserting the conductor tip further comprises the step of inserting the exposed conductor tip of each lead into an intermediate terminal within a corresponding central channel of the motor lead coupler.

\* \* \* \* \*